INVENTORS
DANIEL E. ANDREWS, JR.
WILLIAM E. KLUND
BY
ATTORNEYS

March 28, 1967  D. E. ANDREWS, JR ET AL  3,311,872
TRANSDUCER FACE-VELOCITY CONTROL SYSTEM
Filed Aug. 29, 1963  3 Sheets-Sheet 2

INVENTORS
DANIEL E. ANDREWS, JR.
WILLIAM E. KLUND
BY
ATTORNEYS

FIG. 5
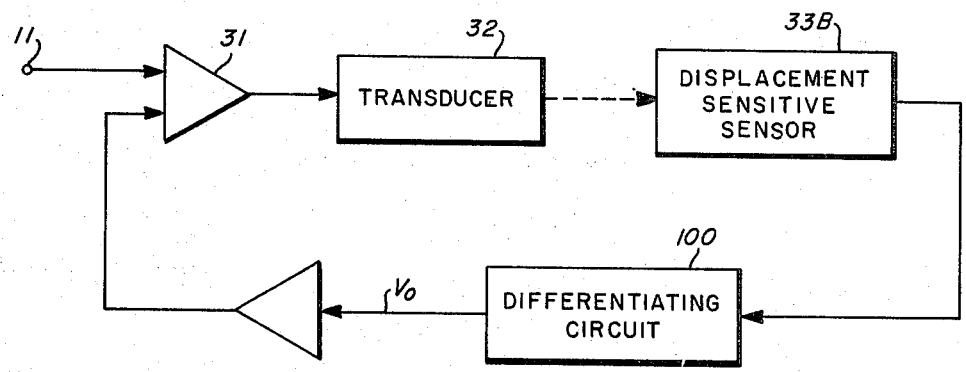
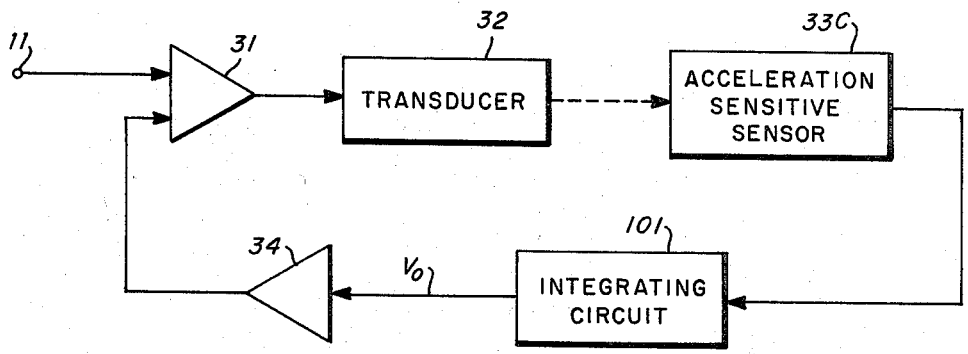
FIG. 6

United States Patent Office 3,311,872
Patented Mar. 28, 1967

3,311,872
TRANSDUCER FACE-VELOCITY CONTROL
SYSTEM
Daniel E. Andrews, Jr., and William E. Klund, San Diego, Calif., assignors to the United States of America as represented by the Secretary of the Navy
Filed Aug. 29, 1963, Ser. No. 305,559
10 Claims. (Cl. 340—8)

The invention described herein may be manufactured and used by or for the Government of the United States of America for governmental purposes without payment of any royalties thereon or therefor.

The present invention relates to an underwater transducer face-velocity control system and more particularly to a transducer face-velocity control system which controls the face-velocities of transducers in a transducer array independent of radiation impedance.

The prior art systems of modularly driven transducer arrays comprise the utilization of a common input signal to a plurality of amplifiers, each amplifier driving a separate transducer in the array. This type of drive attempts to control the individual transducer face velocities by a constant force drive on each transducer. It has been found, however, that the interaction between closely spaced transducers in transducer arrays results in a change or variation of radiation impedance between the different transducers, which in turn produces unlike changes in the face velocities of the individual transducers. The changes of face velocity between closely spaced transducers in turn varies the radiation impedance even more as seen by the individual transducers and a vicious cycle is started resulting in some cases in damage and total failure of some of the transducers in the array.

According to the invention, the face velocity of each individual transducer is sensed either directly or indirectly (i.e., by sensing the displacement or acceleration of the face) by a second or auxiliary transducer mechanically coupled thereto. The face velocity is converted into an electrical signal and fed back as an antiphase or negative feedback signal to the electrical input terminals of the individual amplifier driving the transducer whose face velocity has been sensed. If the product of the amplifier gain and the ratio of the feedback to input signals is >>1, it can be seen that the face velocity of the radiating transducer will be substantially independent of radiation impedance and be proportional to the driving signal, the proportionality being controlled by the feedback factor.

An object of the present invention is the provision of a transducer face-velocity control system for rendering the face velocity of a transducer dependent only upon the driving signal.

Another object is to provide a transducer face-velocity control system in which the transducer face velocity is independent of radiation impedance.

A further object of the invention is the provision of a transducer face-velocity control system for rendering the face velocity of individual transducers in a transducer array free of interaction effects between transducers.

Still another object is to provide a transducer face-velocity control system which is simple, inexpensive and requires a minimum of maintenance and adjustment.

A further object is to meet the above objectives while providing an electrical means for beam forming and for steering the main beam (or beams) of the array in the desired direction (or directions).

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGS. 5 and 6 shows velocity control loop employing, respectively, displacement and acceleration sensitive sensors.

Figure 1:
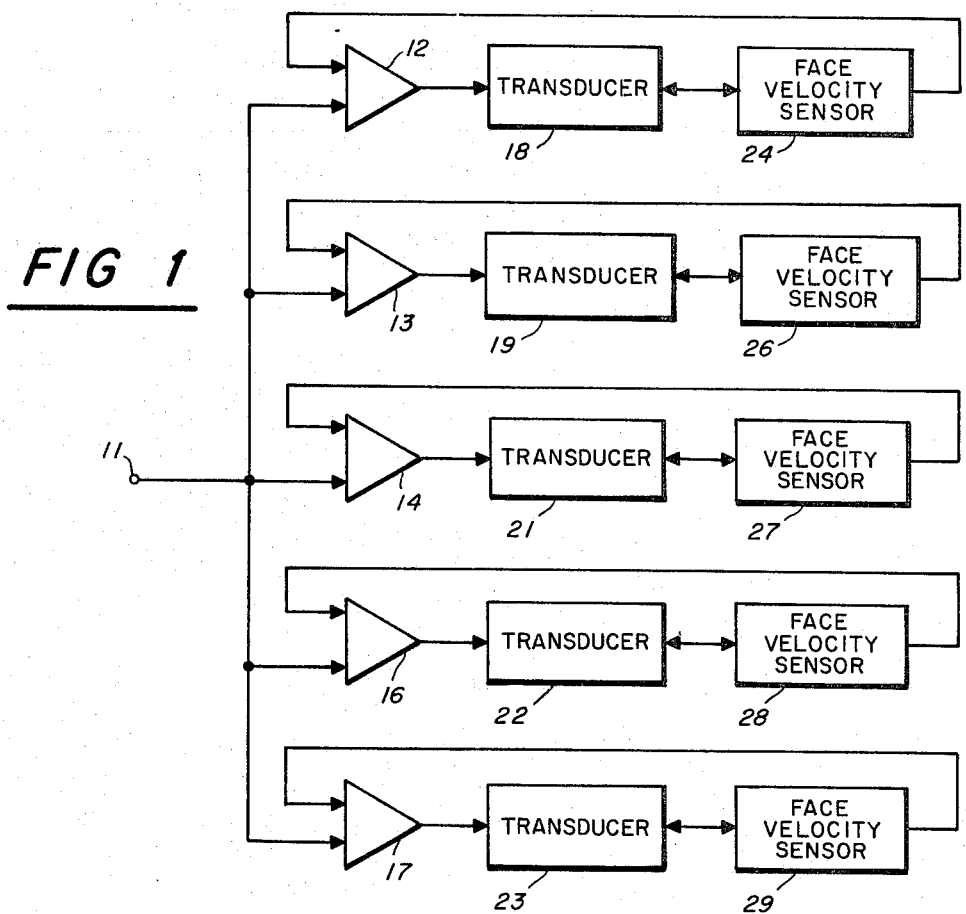
FIG. 1 is a diagram in block form showing a transducer array employing the instant invention.

Referring to FIG. 1, input terminal 11 is connected to one input of amplifiers 12, 13, 14, 16 and 17 through compensation networks not shown. These compensation networks are employed to provide an electrical means for beam formation and steering and are mentioned here for the sake of completeness. The outputs of amplifiers 12, 13, 14, 16 and 17 are connected to transducers 18, 19, 21, 22, and 23, respectively. Transducers 18, 19, 21, 22 and 23 are mechanically coupled to second transducers here shown as face velocity sensors 24, 26, 27, 28 and 29, respectively. The outputs of face velocity sensors 24, 26, 27, 28 and 29 are coupled back to the inputs of amplifiers 12, 13, 14, 16 and 17, respectively.

Figure 2:
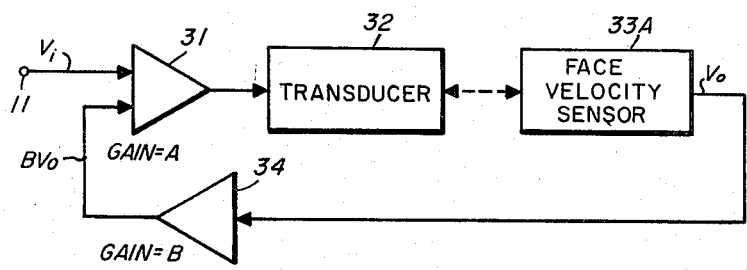
FIG. 2 shows one transducer network of FIG. 1 in block form (in this illustration current in place of voltage feedback could have been employed)

Referring to FIG. 2, one channel of a transducer array as shown in FIG. 1 is depicted having input terminal 11 coupled to amplifier 31 the output of which is coupled to transducer 32. Transducer 32 has sensor 33A mechanically coupled thereto, the output of which is coupled to the input of amplifier 34. The output of amplifier 34 is degeneratively coupled to amplifier 31.

Figure 3:
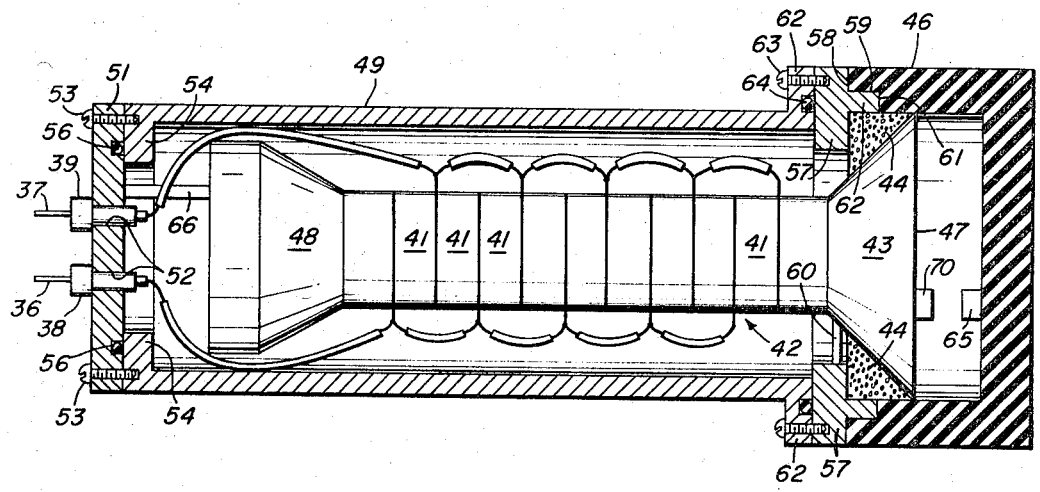
FIG. 3 shows one representative transducer type which can be utilized in the present invention.

Referring to FIG. 3, a piezoelectric ceramic transducer is shown having input leads 36 and 37 passing through seals 38 and 39, respectively, the active element of the transducer comprises ceramic cylinder 42 made up of a series of short end-to-end discs, annuli or cylinders 41, the faces between the segments being joined by soldered metal foil, alternate foils being connected to one of the lead-in wires 36 or 37. Ceramic cylinder 42 has head mass 43 mounted on pressure-release material 44 and held within compliant encapsulating cylinder 46.

The ceramic element 42 also has tail mass 48, the entire unit being disposed within pressure case 49. End plate 51 has bores 52 for seals 38 and 39 and is attached by mounting screws 53 to an inward extension 54 of pressure case 49. O-ring 56 effects a seal between end plate 51 and extension 54. Mounting flange 57 is bonded to encapsulation cylinder 46 at faces 58, 59 and 61 of outward extension 62. Flange 62 is mounted to outwardly extending flange 58 by mounting screws 63. O-ring 64 effects a seal between flange 57 and 62.

Figure 4:
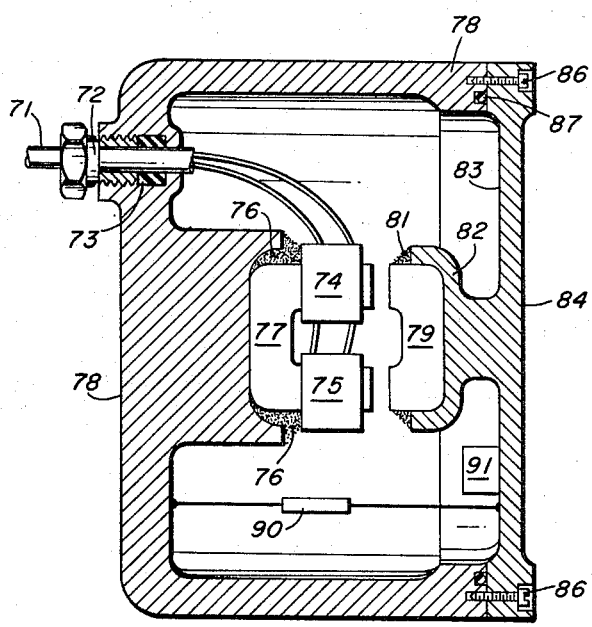
FIG. 4 shows another representative transducer element which can be utilized in the present invention.

Referring to FIG. 4, a typical variable reluctance type of transducer is shown having input cable 71 inserted through plug 72 and packing tube 73 to coils 74 and 75. Coils 74 and 75 are mounted on pole piece 77 which is cemented at 76 to an extension of frame 78. Pole piece 79 is cemented at 81 to extension 82 of diaphragm 83 having radiating face 84. Diaphragm 83 is mounted to frame 78 by mounting screws 86, O-ring 87 effects a seal between mounting frame 78 and diaphragm 83. (In the configuration shown the D.C. polarizing current is caused to flow through the same coils that are used for the signal current. Separate coils could have been used for signal and polarizing currents or a permanent magnet could have been used to supply the polarization.)

*Operation*

Referring back to FIG. 1, the operation will generally be described. An input signal at input terminal 11 is applied to all of the input amplifiers 12, 13, 14, 16 and 17. Each amplifier then drives its associated transducer shown at 18, 19, 21, 22 and 23. The transducers 18, 19, 21, 22, and 23 are mounted in a directional array, and when driven from a common source such as 11, it is desirable that all the transducers have identical or, in the case of shading, previously and individually specified face velocities so that the radiation pattern is preserved. It has been found however, that due to the proximity of the transducers, interaction of the transducers radiation causes a variance of face velocity which in turn distorts the signal pattern and may damage the transducer itself. To overcome this, a face velocity sensor for each transducer, shown at 24, 26, 27, 28 and 29 senses the face velocity and feeds it back as an electrical signal to the input amplifier in a degenerative phase. Hence, if the face velocity of any one transducer tends to increase, the feedback from the face velocity sensor will decrease the total drive to the transducer, reducing the face velocity. In the same manner, if the face velocity of a given transducer tends to decrease the feedback from the face, velocity sensor will likewise decrease, increasing the total drive to the transducer and restoring the transducer to its original face velocity.

Referring to FIG. 2, a more detailed description is given of one individual channel. Here the input again is shown at 11 feeding amplifier 31 the output of which drives transducer 32. The transducer sensor 33A is velocity sensitive and is mechanically coupled to the face of transducer 32. The output $V_o$ of this transducer will then be an electrical signal proportional to and in phase with the face velocity of transducer 32 which is amplified in amplifier 34 and fed back to amplifier 31 out of phase with the input signal at 11.

Mathematically, if the total gain without feedback of amplifier 31 coupled to transducers 32 and 33 is equal to A, the output voltage from the sensor or transducer 33A is $V_o$, the amplification in aplifier 34 is B, and the feedback input to amplifier 31 will be $BV_o$. The total effective input signal to amplifier 31 will be $V_i + BV_o$. $V_o$ will then be equal to $(V_i + BV_o) \times A$ or upon multiplying, $V_o = AV_i + ABV_o$. This equation yields $AV_i = 1 - ABV_o$, hence $$\frac{V_o}{V_i} = \frac{A}{1 - AB}$$

It can be seen that if $-AB$ is large with respect to unity, $V_o/V_i$ will approximate minus $1/B$.

If $V_o$ is then directly proportional to the face velocity of transducer 32 and as shown above is approximately equal to $V_i/B$, the face velocity will depend upon the two parameters, the input voltage and the feedback factor. Hence, it can be seen that variations in radiation resistance or impedance will not affect the face velocity of the transducers, and if all transducers have a common input signal and the same feedback factor, all will have equal face velocities.

Referring back to FIG. 3, the face sensors can be as indicated at 66 sensing indirectly the face velocity by sensing the difference of velocities between plate 51 and tail mass 48, or at 60 sensing the difference in velocities between flange 57 and the head mass 43. Accelerometers could be attached directly to face 47 of head mass 43 or indirect to encapsulating cylinder 46 as shown at 65 and 70 to yield face velocity after integration of its output signal.

In the transducer of FIG. 4 a bender or strain measuring element could be cemented to the inner wall or back of diaphragm 83 as shown at 91. A strain gage 91 affixed to the portion of the diaphragm which flexes in operation will produce a terminal voltage proportional to the displacement of the diaphragm. To obtain the voltage $V_o$ proportional to velocity from the displacement voltage, a first derivative, obtained with a conventional differentiating circuit, would be necessary as shown at 100 in the output of sensor 33B in FIG. 5. Diaphragm displacement could, of course, be measured by measuring the distance between the diaphragm and some reference point as suggested at 90 in FIG. 4. Alternatively, an acceleration sensitive sensor 33C may be mechanically coupled to the transducer 32 for measuring the acceleration of the radiating face. To derive the desired velocity voltage $V_o$, from such an accelerometer, shown in FIG. 6, the integrating circuit 101 would be necessary in the output of the sensor.

Naturally many other types of transducers can be utilized as the velocity sensing element such as shaker boxes or those employing pistons and vibrating shelves. It should be understood, of course, that the disclosure relates to only preferred embodiments of the invention and that it is intended to cover all changes and modifications of the example of the invention herein chosen for the purposes of the disclosure, which do not constitute departure from the spirit and scope of the invention.

What is claimed is:
A transducer face-velocity control system comprising:

1. A transducer face-velocity control system comprising:
   a plurality of first transducers with radiating faces spacially disposed in an array for converting an electrical wave into reciprocations of said faces;
   a plurality of second transducers, each coupled mechanically to a different one of said first transducers for sensing said first transducers' face velocity and converting said face velocity into a corresponding electrical wave,
   a plurality of amplifiers, each of said amplifiers having an output electrically coupled to a different one of said first transducers;
   each of said second transducers having an output degeneratively coupled to the input of its respective one of said plurality of amplifiers;
   whereby said amplifiers and first and second transducers form a plurality of channels of modular driven transducers each channel having denegerative feedback in proportion to the face velocity of the transducer in that channel.

2. The transducer face-velocity control system of claim 1 and further including a second plurality of amplifiers each coupled for amplifying said output of a separate one of said second transducers.

3. The transducer face-velocity control system of claim 1 wherein:
   said second transducers comprise accelerometers for generating a wave which is a function of face acceleration; and
   means coupled to said accelerometers for integrating the output of said accelerometers to generate a wave which is a function of face velocity.

4. The transducer face-velocity control system of claim 2 wherein:
   amplification from the signal input of each of said first amplifiers to the feedback input of the same amplifier is essentially unity in magnitude and degenerative in nature when feedback is applied.

5. The transducer face-velocity control system of claim 1 wherein:
   said second transducers are displacement sensitive; and
   differentiating means coupled to said displacement sensitive transducer for generating a signal voltage representative of face velocity.

6. A transducer face-velocity control system comprising:
   a first transducer for converting electrical waves into corresponding electrical wave.
   a second transducer mechanically coupled to said first transducer for sensing said first transducer's face velocity and converting said face velocity into a corresponding electrical waves;

an amplifier, said amplifier having an output electrically coupled to said first transducer;

said second transducer having an output so coupled to said amplifier input as to degeneratively apply the face velocity electrical wave to the input of said amplifier.

7. The transducer face-velocity control system of claim 6 and further including:

a second amplifier coupled for amplifying said output of said second transducer.

8. The transducer face-velocity control system of claim 7 wherein:

amplification from the signal input of said first amplifier to the feedback input of the same amplifier is essentially unity in magnitude and degenerative in nature when feedback is applied.

9. The transducer face-velocity control system of claim 6 wherein:

said second transducer is an accelerometer; and the velocity feedback signal is derived by integrating the output of said accelerometer.

10. The transducer face-velocity control system of claim 6 wherein:

said second transducer is displacement sensitive; and the velocity feedback signal is derived by differentiating the output of said second transducer.

References Cited by the Examiner

UNITED STATES PATENTS

| | | | |
|---|---|---|---|
| 2,806,155 | 9/1957 | Rotkin | 310—8.1 |
| 2,878,886 | 3/1959 | Overton | 310—8.1 |
| 3,230,503 | 1/1966 | Elliot | 340—10 |

CHESTER L. JUSTUS, *Primary Examiner.*

MILTON O. HIRSHFIELD, *Examiner.*

J. D. MILLER, B. L. RIBANDO,
*Assistant Examiners.*